(12) United States Patent
Sparr

(10) Patent No.: US 12,386,079 B2
(45) Date of Patent: Aug. 12, 2025

(54) MULTI-LEVEL AIDING SIGNAL TO SUPPORT RAPID COMMUNICATION

(71) Applicant: SRI INTERNATIONAL, Menlo Park, CA (US)

(72) Inventor: Robert Sparr, Menlo Park, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 0 days.

(21) Appl. No.: 18/837,096

(22) PCT Filed: Dec. 14, 2022

(86) PCT No.: PCT/US2022/081575
§ 371 (c)(1),
(2) Date: Aug. 8, 2024

(87) PCT Pub. No.: WO2023/167754
PCT Pub. Date: Sep. 7, 2023

(65) Prior Publication Data
US 2025/0110244 A1    Apr. 3, 2025

Related U.S. Application Data

(60) Provisional application No. 63/315,465, filed on Mar. 1, 2022.

(51) Int. Cl.
*G01S 19/30* (2010.01)
*G01S 19/02* (2010.01)
(Continued)

(52) U.S. Cl.
CPC ............. *G01S 19/30* (2013.01); *G01S 19/02* (2013.01); *H04B 1/70735* (2013.01); *H04L 63/0428* (2013.01)

(58) Field of Classification Search
CPC ..... G01S 19/30; G01S 19/02; H04B 1/70735; H04B 1/707; H04L 63/0428
See application file for complete search history.

(56) References Cited

U.S. PATENT DOCUMENTS

| 7,272,376 B1 | 9/2007 | Sparr et al. |
| 2003/0016170 A1* | 1/2003 | Jandrell ................ G01S 5/0063 |
| | | 342/357.64 |

(Continued)

FOREIGN PATENT DOCUMENTS

| CN | 112444830 A * | 3/2021 | ............. G01S 19/30 |
| EP | 1 071 966 | 5/2012 | |

(Continued)

OTHER PUBLICATIONS

18837096_2025-01-29_CN_112444830_A_M.pdf, machine translation of CN-112444830-A (Year: 2021).*

(Continued)

*Primary Examiner* — William Kelleher
*Assistant Examiner* — Kenneth W Good
(74) *Attorney, Agent, or Firm* — MCDONNELL BOEHNEN HULBERT & BERGHOFF LLP

(57) ABSTRACT

Disclosed herein are methods and systems that involve an aiding signal that can be used to acquire a long code in a wireless signal, such as a ranging code in a wireless navigation signal transmitted by a satellite. A receiver may receive a first wireless signal and a first aiding signal transmitted by a first transmitter of a plurality of transmitters. The first wireless signal comprises a first, long code. The first aiding signal comprises repeating instances of a sequence of short codes, wherein the sequence has a predetermined time relationship with the first long code and is specific to the first transmitter. The receiver may use the first aiding signal to acquire the first long code by determining the sequence of short codes in the first aiding signal and (Continued)

using the predetermined time relationship to synchronize with the first long code.

20 Claims, 4 Drawing Sheets

(51) Int. Cl.
*H04B 1/7073* (2011.01)
*H04L 9/40* (2022.01)

(56) References Cited

U.S. PATENT DOCUMENTS

| | | | |
|---|---|---|---|
| 2003/0058928 A1* | 3/2003 | King | G01S 19/02 375/147 |
| 2004/0041728 A1* | 3/2004 | Bromley | G01S 19/29 342/357.64 |
| 2005/0089083 A1* | 4/2005 | Fisher | H04B 1/7075 375/130 |
| 2006/0291537 A1 | 12/2006 | Fullerton et al. | |
| 2007/0160120 A1* | 7/2007 | Simpson | H04B 1/70775 375/E1.015 |
| 2007/0210958 A1* | 9/2007 | Van Wechel | G01S 19/24 342/357.77 |
| 2009/0100317 A1* | 4/2009 | Lakkis | H04B 1/69 714/783 |
| 2010/0304706 A1 | 12/2010 | Haverty | |
| 2011/0194571 A1 | 8/2011 | Ozluturk et al. | |
| 2016/0259061 A1* | 9/2016 | Carter | G01S 19/05 |
| 2021/0033737 A1 | 2/2021 | Younis et al. | |
| 2021/0373179 A1* | 12/2021 | McBurney | G01S 19/428 |

FOREIGN PATENT DOCUMENTS

| | | | | |
|---|---|---|---|---|
| RU | 2236088 C2 * | 9/2004 | ......... | H04B 1/70751 |
| WO | 2013/173800 | 11/2013 | | |

OTHER PUBLICATIONS

18837096_2025-01-29_RU_2236088_C2_M.pdf, machine translation of RU-2236088-C2 (Year: 2004).*
18837096_Jan. 29, 2025_CN_112444830_A_M.pdf, machine translation of CN-112444830-A (Year: 2021).*
18837096_Jan. 29, 2025_RU_2236088_CZ_M.pdf, machine translation of RU-2236088-C2 (Year: 2004).*
The International Search Report (ISR) with Written Opinion for PCT/US2022/081575 dated Mar. 31, 2023 pp. 1-7.
Buzzi et al., "Code-Aided Interference Suppression for OS/CDMA Overlay Systems", IEEE, Mar. 2002, retrieved on [Feb. 16, 2023]. Retrieved from the internet <URL: https://ieeexplore.ieee.org/stamp/stamp.jsp?tp=&amumber-993406> entire document.
Wang, Yi-Pin Eric et al. "Cell Search in W-CDMA" IEEE Journal on Selected Areas in Communications (2000) vol. 18(8), pp. 1470-1482.
Sriram, Sundararajan et al. "Cyclically Permutable Codes for Rapid Acquisition in DS-CDMA Systems with Asynchronous Base Stations" IEEE Journal on Selected Areas in Communications (2001), vol. 19(1), pp. 83-94.
Dahlman, Erik et al. "WCDMA—The Radio Interface for Future Mobile Multimedia Communications" IEEE Transactions on Vehicular Technology (1998) vol. 47(4), pp. 1105-1118.

* cited by examiner

MULTI-LEVEL AIDING SIGNAL TO SUPPORT RAPID COMMUNICATION

CROSS REFERENCE TO RELATED APPLICATION

This application is a U.S. National Phase of International Application No. PCT/US2022/081575, filed Dec. 14, 2022, which claims priority to U.S. Provisional Patent Application No. 63/315,465, filed Mar. 1, 2022, both of which are incorporated by reference herein in their entirety.

BACKGROUND

Satellite-based navigation systems, such as the Global Positioning System (GPS) and Galileo, use long codes designed to allow user equipment (e.g., navigation receivers) to measure the ranges to each visible satellite. The user equipment usually observes most or all of the long code to achieve synchronization before the range computation (and user location fix) can be performed. In a cold start case, the user equipment does not have any information about its location or which satellites might be in view. A conventional GPS receiver can take several minutes to achieve its first location fix in such circumstances. In a warm start case, the user equipment has a priori estimates of the receiver location, the time, and the orbital ephemerides of the entire satellite constellation, all of which enables the receiver to greatly reduce the synchronization search space. However, if the satellites transmit a ranging code that is encrypted with an asymmetric or public-key system, a warm start can be difficult to perform, thus increasing the time to reacquire the ranging code and produce a new user location after a dropout due to signal blockage, such as driving through a tunnel. In such circumstances, a warm start can take a similar amount of time as a cold start to obtain a location fix.

In addition, while GPS and Galileo use satellites that are in a medium Earth orbit (MEO), such that each satellite may stay in view for several hours, other satellite-based navigation systems may use satellites that are in a low Earth orbit (LEO). Such LEO satellites will stay in view for a much shorter period of time (e.g., less than 10 minutes). This makes the several minutes that can be required for conventional navigation receivers to obtain a location fix particularly problematic.

Accordingly, there is a need for methods and systems that can acquire ranging codes more quickly.

SUMMARY

In a first aspect, a method is provided. The method includes receiving a first wireless signal transmitted by a first transmitter of a plurality of transmitters, wherein the first wireless signal comprises a first long code. The method also includes receiving a first aiding signal transmitted by the first transmitter, wherein the first aiding signal comprises repeating instances of a sequence of short codes, wherein the sequence of short codes has a predetermined time relationship with the first long code, and wherein the sequence of short codes is specific to the first transmitter. The method further includes acquiring the first long code using the first aiding signal, wherein acquiring the first long code using the first aiding signal comprises determining the sequence of short codes in the first aiding signal and using the predetermined time relationship to synchronize with the first long code.

In a second aspect, a receiver is provided. The receiver is configured to perform the method of the first aspect.

In a third aspect, a transmitter is provided. The transmitter is configured to transmit a first wireless signal, wherein the first wireless signal comprises a first long code. The transmitter is further configured to transmit a first aiding signal, wherein the first aiding signal comprises repeating instances of a sequence of short codes, wherein the sequence of short codes bas a predetermined time relationship with the first long code, and wherein the sequence of short codes is specific to the transmitter.

BRIEF DESCRIPTION OF THE FIGURES

Various example embodiments can be more completely understood in consideration of the following detailed description in connection with the accompanying drawings, in which.

DETAILED DESCRIPTION

Figure 1:
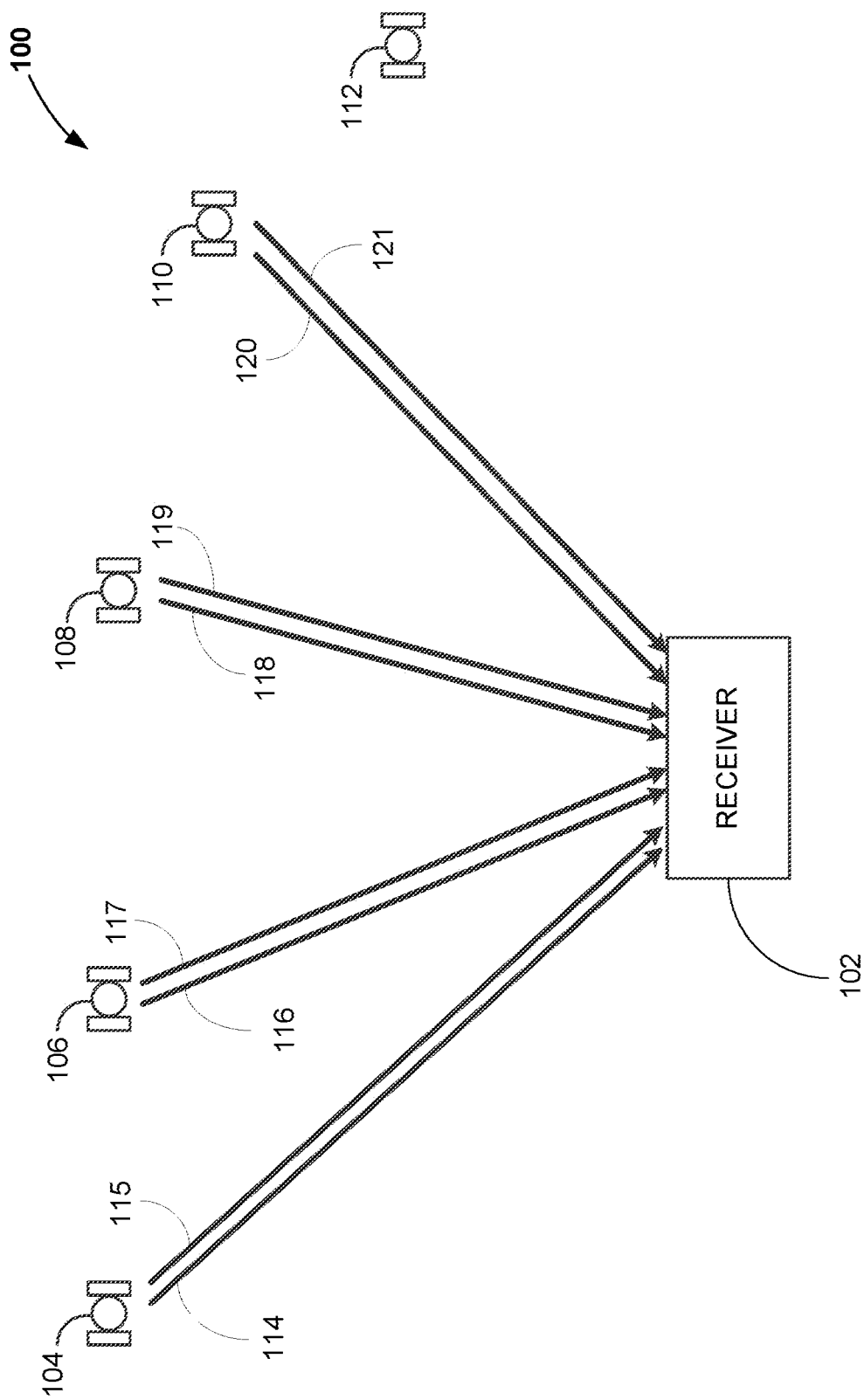
FIG. 1 illustrates an example satellite-based navigation system, in accordance with example embodiments.

This disclosure describes inventive concepts with reference to specific examples. However, the intent is to cover all modifications, equivalents, and alternatives of the inventive concepts that are consistent with this disclosure. It will be apparent, however, to one of ordinary skill in the art that the present approach can be practiced without these specific details. Thus, the specific details set forth are merely exemplary, and is not intended to limit what is presently disclosed. The features implemented in one embodiment may be implemented in another embodiment where logically possible. The specific details can be varied from and still be contemplated to be within the spirit and scope of what is being disclosed.

Overview

A transmitter (e.g., a satellite in a satellite-based navigation system) can transmit a wireless signal that includes a long code (e.g., a ranging code) and also transmit an aiding signal that enables a receiver to quickly acquire the long code. The aiding signal can include a sequence of short codes that has a predetermined time relationship with the long code. In some examples, the sequence of short codes can have the same duration as and temporally coincide with an instance of a long code. In other examples, the long code could be much longer than the sequence of short codes or could be non-repeating. The predetermined time relationship reduces the search space that a receiver may search through in order to synchronize with the long code. Each short code may be too short to be usable for ranging. However, the short length beneficially improves Doppler shift tolerance.

To support fast acquisition of a long code in environments in which multiple transmitters are transmitting such long codes, the aiding signal can beneficially be structured as a multi-layered signal that includes a primary layer and a secondary layer. The primary layer may include repeated instances of a primary code that is the same for each transmitter (e.g., each satellite in a constellation of satellites). The secondary layer may include the sequence of short codes. Different transmitters can transmit different sequences of short codes, so that a particular sequence of short codes in the secondary layer can be used to identify the particular transmitter. The primary code in the primary layer bas a predetermined time alignment with each short code in the secondary layer. Once a receiver detects a primary code from a particular transmitter, the receiver will know when the short codes will occur based on the predetermined time alignment. Thus, detecting a transmitter's primary code enables a receiver to quickly detect the transmitter's sequence of short codes, which, in turn, enables the receiver to quickly synchronize with the transmitter's long code. This approach also addresses the issues involved in accessing a radio channel shared by multiple transmitters (e.g., multiple satellites). The signals from different transmitters need not be synchronized with each other.

This approach also provides a solution for acquiring long codes that are encrypted. The sequence of short codes in the secondary layer identifies the transmitter. Thus, a receiver can use a look-up table or other data structure or algorithm to obtain a decryption key for decrypting the encrypted long code that is transmitted by the transmitter identified by the sequence of short codes.

Example Satellite-Based Navigation System

FIG. 1 illustrates an example satellite-based navigation system 100, in accordance with example embodiments. In this example, satellite-based navigation system 100 includes a receiver 102 that receives wireless signals from satellites 104, 106, 108, and 110. Receiver 102 could be located on or proximate to the surface of the Earth. For example, receiver 102 could be in a terrestrial vehicle, an aircraft, a boat, a smartphone, or some other type of structure or device. Satellites 104-110 could be orbiting the Earth, for example, in a low Earth orbit (LEO) or a medium Earth orbit (MEO). As a result, satellites 104-110 may move relative to receiver 102. Because of this relative motion, each of satellites 104-110 may be in line-of-sight communication with receiver 102 for only a particular period of time, which could be less than an hour or less than ten minutes. To accommodate this relative motion, the satellite-based navigation system 100 could include a constellation of satellites that (e.g., 12 satellites, 16 satellites, etc.) so that satellites are continuously moving into and out of line-of-sight communication with receiver 102, with an arrangement that enables receiver 102 to reliably receive wireless signals from at least four satellites at any given time. This is exemplified in FIG. 1 by satellite 112, which is not currently in line-of-sight communication with receiver 102. If the satellites are moving generally to the left, then satellite 104 may move out of line-of-sight communication with receiver 102, and satellite 112 may move into line-of-sight communication with receiver 102. At that point, receiver 102 may use the wireless signals transmitted by satellite 112 instead of the wireless signals transmitted by satellite 104.

In the example illustrated in FIG. 1, the wireless signals transmitted by each satellite include a navigation signal and an aiding signal that receiver 102 can use to acquire the navigation signal. As shown, receiver 102 receives a navigation signal 114 and an aiding signal 115 transmitted by satellite 104, a navigation signal 116 and an aiding signal 117 transmitted by satellite 106, a navigation signal 118 and an aiding signal 119 transmitted by satellite 108, and a navigation signal 120 and an aiding signal 121 transmitted by satellite 110.

Each of the navigation signals 114-120 includes a long code that can be used for ranging. Thus, the long code may be described as a ranging code. The long code could be, for example, a pseudorandom noise (PRN) code. In some examples, the long codes in each of the navigation signals 114-120 are encrypted, for example, using an encryption that is specific to the transmitting satellite. In such examples, receiver 102 decrypts each of the encrypted long codes in the navigation signals 114-120 (e.g., using a different decryption key for each of satellites 104-110) in order to use the long codes for ranging.

Each of navigation signals 114-120 may also include a navigation message that is modulated onto the long code. The navigation message may include ephemeris data that can be used to calculate the precise orbital position of the satellite that transmitted the navigation message, as well as other information. Receiver 102 may be configured to use the navigation messages in the navigational signals 114-120 along with the ranges determined from the ranging codes in the navigational signals 114-120 to determine a location of the receiver 102 in an Earth-based coordinate system (e.g., latitude, longitude, and elevation). The location determined in this way could be accurate to within 100 meters in some implementations, accurate to within 10 meters in other implementations, or accurate to within 1 meter in still other implementations.

The aiding signals 115-121 transmitted by satellites 104-110 can be used by receiver 102 to acquire navigation signals 114-120, respectively, in a period of time that is relatively short compared to the period of time in which each of satellites 104-110 is in line-of-sight communication with receiver 102. As noted above, each of satellites 104-110 may be in line-of-sight communication with receiver 102 for less than ten minutes. In example embodiments, aiding signals 115-121 may enable receiver 102 to acquire navigation signals 114-120 in less than one minute in a "cold start" case (i.e., when receiver 102 does not have any information about its location or which satellites might be in view), even when the long codes in navigation signals 114-120 are encrypted.

In example embodiments, the navigation signals transmitted by all of the satellites in the constellation occupy the same frequency bandwidth. Navigation signals transmitted by different satellites do not interfere with each other, for example, because of PRN codes being used as the long codes in the navigation signals. In example embodiments, the aiding signals transmitted by all of the satellites in the constellation also occupy the same frequency bandwidth (e.g., the same frequency bandwidth as the navigation signals or a different frequency bandwidth). For example, the navigation signals and aiding signals could occupy the same frequency bandwidth by using code-division multiplexing techniques. This may involve multiplying the navigation signals by Walsh codes, Hadamard codes, M-sequences, Gold codes, Kasami codes, or other orthogonal codes. As described in more detail below, the aiding signals can be structured with codes such that aiding signals transmitted by different satellites have little or no interference with each other. Moreover, the signals from different satellites need not be synchronized in order to achieve this lack of interference.

Example Signal Structure

Figure 2:
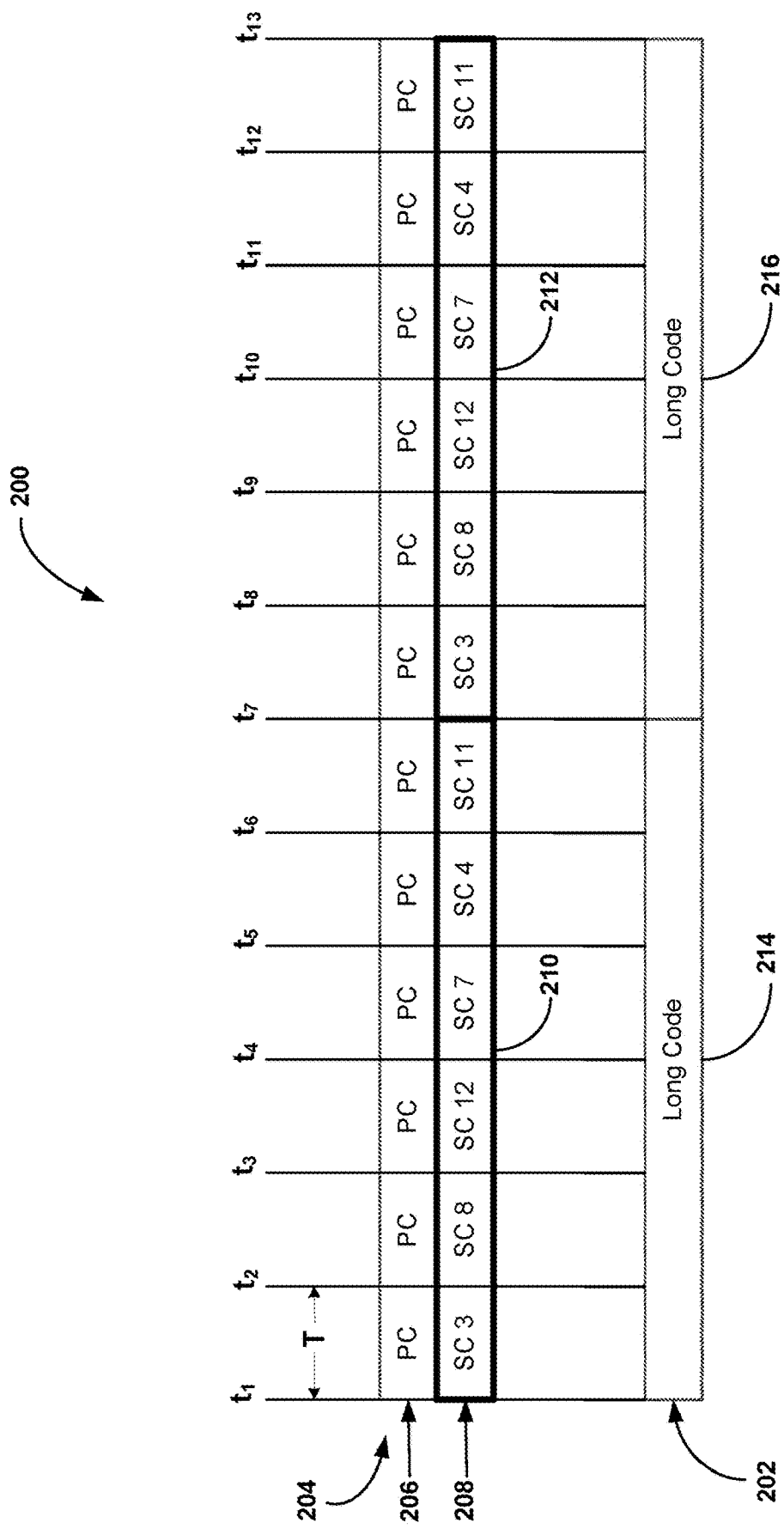
FIG. 2 illustrates an example signal structure, in accordance with example embodiments.

FIG. 2 illustrates an example signal structure 200 for a navigation signal 202 and an aiding signal 204 that can be used to acquire the navigation signal 202. With reference to FIG. 1, the navigation signal 202 and aiding signal 204 could, for example, correspond to the navigation signal 114 and aiding signal 115, respectively, transmitted by satellite 104, or to the navigation signal and aiding signal transmitted by any other satellite in the constellation.

In this example, aiding signal 204 includes a primary layer 206 and a secondary layer 208. The primary layer 206 includes repeating instances of a primary code (PC). The secondary layer 208 includes repeating instances of a sequence of short codes (SC 3, SC 8, SC 12, SC 7, SC 4, and SC 11), exemplified in FIG. 2 by sequence instance 210 and sequence instance 212. The navigation signal 202 includes repeating instances of a long code, exemplified in FIG. 2 by long code instance 214 and long code instance 216.

FIG. 2 illustrates an example time alignment between the primary codes in the primary layer 206, the short codes in the secondary layer 208, and the long codes in the navigation signal 202. In this example, each PC instance defines a time slot of duration T. FIG. 2 illustrates a period of time that includes twelve time slots. As shown, the time slots include a first time slot from time $t_1$ to time $t_2$, a second time slot from time $t_2$ to time $t_3$, and so forth, up to the twelfth time slot from time $t_{12}$ to time $t_{13}$. In the secondary layer 208, each short code is transmitted in a respective time slot. Thus, FIG. 2 shows the first short code (SC 3) in the first time slot, the second short code (SC 8) in the second time slot, etc. In this example, the sequence of short codes is made up of six short codes, so each instance of the sequence (e.g., sequence instances 210 and 212) occupies six time slots. In this example, each instance of the long code in navigation signal 202 also occupies six time slots and coincides with a respective instance of the short code sequence in secondary layer 208. Thus, long code instance 214 coincides with sequence instance 210, and long code instance 216 coincides with sequence instance 212.

Each instance of the primary code transmitted in the primary layer 204 may define a respective time slot by fully occupying the time slot. For example, the beginning of the primary code may define the beginning of a time slot, and the end of the primary code may define the end of the time slot. Alternatively, a time slot may have a duration that is greater than the duration of the primary code. For example, the beginning of a time slot may be defined by some fixed amount of time before the beginning of the primary code and/or the end of a time slot may be defined by some fixed amount of time after the end of the primary code.

In example embodiments, each satellite transmits the same primary code in the primary layer of the satellite's aiding signal. Because different satellites will have different range delays to the receiver, and because the satellites' respective signals may not be synchronized with teach other, it is beneficial for the primary code to be a code that is reasonably orthogonal to cyclic shifts of itself. As one possible implementation, the primary code could be a maximum length sequence (M-sequence). An M-sequence can provide some of the best autocorrelation performance for a given code length (e.g., a narrow peak and low sidelobes), which can translate to optimal performance against cyclic shifts. However, other implementations of the primary code, such as Barker sequences or JPL codes, are possible as well.

With each satellite transmitting the same primary code, and with the primary code being suitably orthogonal to cyclic shifts of itself, a receiver can include a matched filter for the primary code that produces a peak for every satellite in view. In this way, the receiver can determine the timing of the time slots in each satellite's respective aiding signal. As described below, the time slot timing determined from the primary code in the primary layer can be used to detect the sequence of short codes in the secondary layer, which in turn enables fast acquisition of the long code in the satellite's navigation signal.

As shown in FIG. 2, each short code in the secondary layer 208 is transmitted in a time slot defined by a respective instance of the primary code in the primary layer 206. In some embodiments, each short code is equal in length to the primary code and begins and ends at the same times that a corresponding instance of the primary code begins and ends. For example, the primary code and each short code may fully occupy each time slot. Alternatively, the short code may begin some fixed amount of time before or after the primary code begins and/or the short code may end some fixed amount of time before or after the primary code ends. In general, each satellite transmits the short codes in the secondary layer with a predetermined time alignment with corresponding instances of the primary code in the primary layer, such that each short code begins/ends either simultaneously with or with a predetermined time offset relative to a corresponding instance of the primary code. A receiver can use this predetermined time alignment to determine when short codes will occur based on when instances of the primary code are detected.

In example embodiments, the short codes in the secondary layer are selected from a library of N short codes. In some implementations, N could be equal to or otherwise related to the number of satellites in the constellation. In the example illustrated in FIG. 2, the library includes 12 short codes (SC 1, SC 2, . . . . SC 12). It is to be understood, however, that N could be greater than 12 or less than 12, in different implementations. The sequence of short codes in the secondary layer could include all N short codes in the library, or just a subset of the N codes in the library. In the example illustrated in FIG. 2, the sequence of short codes in the secondary layer 208 is made up of six short codes (SC 3, SC 8, SC 12, SC 7, SC 4, and SC 11) from the library of 12 short codes. However, other examples are possible as well. In general, the sequence of short codes includes M distinct short codes selected from the library of N short codes, with 1<M≤N, to provide a sequence of any length. In some cases, one or more short codes could be repeated in the sequence of short codes.

In example embodiments, the N short codes in the library are reasonably orthogonal to each other (mutually orthogonal), including shifts. In some implementations, the short codes could be Gold codes. Preferred-pair Gold codes have good cross-correlation properties and acceptable autocorrelation properties. There are $2^n-1$ preferred-pair Gold codes available at length $L=2^n-1$ (e.g., 256 codes of length 256). In other implementations, the short codes could be Kasami codes. Small-set Kasami codes can have cross-correlation properties and autocorrelation properties that are better than Gold codes. There are $2^{n/2}$ small-set Kasami codes available at length $L=2^n-1$ (example: 16 codes of length 256).

In some implementations, the short codes may use a chip rate that is lower than that of the long code. A lower chip rate can beneficially make the short codes less sensitive to Doppler, though at the expense of less precision in time alignment with the long code. Alternatively, the chip rate of the short codes could be equal to the chip rate of the long code.

In example embodiments, each satellite in the constellation transmits a different sequence of short codes in the secondary layer of its respective aiding signal. For example, one satellite in the constellation (e.g, satellite 104) may transmit the sequence SC 3, SC 8, SC 12, SC 7, SC 4, and SC 11 as shown in FIG. 2, while another satellite (e.g., satellite 106) may transmit a different sequence, such as SC 5, SC 6, SC 10, SC 2, SC 3, SC 12. Accordingly, the sequence of short codes in the secondary layer of the aiding signal can be used to identify the satellite that transmitted the aiding signal. However, the short codes in the different sequences transmitted by different satellites are all selected from the same library of N short codes. With only N short codes being used, a receiver can include a bank of N matched filters to detect any sequence of short codes in the secondary layer that is transmitted by a particular satellite. In this approach, each matched filter is configured to detect a respective short code in the library, and the sequence of the short codes detected by the various matched filters can be used to determine the sequence of short codes in the secondary layer and, in turn, identify the particular satellite that transmitted the secondary layer.

The matched filters can also make use of the time slot timing that is determined from the detected primary code to detect the short codes quickly and efficiently. For example, based on the predetermined time alignment between instances of the primary code in the primary layer and instances of the short codes in the secondary layer, the matched filters do not need to search over all time to detect the short codes; they only need to check time slots that are already known from detecting one or more instances of the primary code in the primary layer.

The sequences of short codes transmitted by different satellites can be designed to maximize Hamming distances between them over cyclic shifts. By using the maximum possible Hamming distance sequences, a receiver may be able to uniquely identify a sequence of short codes and its alignment based on observing a sufficient subset of the sequence. Thus, in some embodiments, the entire sequence need not be observed in order to identify the sequence and, in turn, the satellite that transmitted the sequence. In addition, the Hamming distances between the sequences can provide a degree of error correction. For example, a sequence may be correctly identified even if one of the short codes in the sequence is not detected or is detected incorrectly. Depending on the sequence lengths and Hamming distances, errors in even more than one of the short codes in the sequence may not alter the sequence enough to cause confusion with other sequences used in the constellation of satellites. In some examples, Reed-Solomon coding techniques could be used to design the short code sequences of the different satellites to maximize the Hamming distances between them and/or to provide for a degree of error correction. For instance, with reference to FIG. 2, the individual short codes (SC 3, SC 8, SC 12, SC 7, SC 4, and SC 11) in the sequence could be Gold codes or Kasami codes and the specific ordered sequence of the six short codes (SC 3-SC 8-SC 12-SC 7-SC 4-SC 11) could be a Reed-Solomon code word.

In example embodiments, each instance of the short code sequence in the secondary layer of the aiding signal is equal in duration and aligned in time to an instance of the long code (or the encrypted long code, if the long code is encrypted) in the navigation signal. For example, FIG. 2 shows sequence instances 210 and 212 as being aligned in time with long code instances 214 and 216, respectively, and as having the same duration (six time slots). Alternatively, each instance of the short code sequence could be aligned in time with some identifiable subset of the long code, such as integer-second boundaries of the long code. This approach may be used in implementations in which each long code instance in the navigation signal has a duration that is longer than that of each sequence of short codes in the aiding signal.

For example, long code instance 214 might begin at some time before $t_1$ and might end some time after $t_7$, so as to be longer than sequence instance 210 shown in FIG. 2. Nonetheless, sequence instance 210 may be aligned with a predetermined portion of long code instance 214. For example, the beginning of sequence instance 210 ($t_1$) may be timed to occur at one second, two seconds, or some other integral number of seconds after the beginning of long code instance 214. In general, the second layer of the aiding signal can be structured so that each instance of the sequence of short codes has a predetermined time relationship with an instance of the long code (or encrypted long code, if the long code is encrypted).

A receiver can use this predetermined time relationship to acquire the long code in the navigation signal quickly and efficiently once the receiver has identified the sequence of short codes in the secondary layer of the aiding signal. Based on the timing of the sequence of short codes, the receiver can determine the specific time (e.g., with an accuracy dependent upon the chip rate of the short code) when each instance of the long code will begin (in implementations in which the long codes have the same duration as the short code sequences) or can identify a small number of times when an instance of the long code may begin (in implementations in which the long codes have a longer duration than the short code sequences). Further, if the sequence of short codes is aligned with a subset of the long code, a small message could be embedded in the aiding signal to inform the receiver which internal boundary corresponds to the current sequence of short codes. In this way, the predetermined time relationship between the short code sequences in the secondary layer of the aiding signal and the long code instances in the navigation signal can greatly reduce the search space used to acquire the long code.

If the long code is encrypted, then the receiver may also use the sequence of short codes to determine how to decrypt the encrypted long code. As noted above, each satellite may encrypt the long code that it transmits using an encryption that is specific for that satellite. In such cases, each satellite's encrypted long code may be decrypted using a decryption key that is specific for that satellite. A receiver may have access to a look-up table or other data structure or algorithm that the receiver can use to determine a satellite's decryption key based on the satellite's identity determined from the sequence of short codes detected in the secondary layer of the aiding signal. For example, a look-up table may map each satellite in the constellation (e.g., as identified by the sequence of short codes specific to that satellite) to a decryption key that can be used to decrypt the satellite's encrypted long code.

Example Receiver

Figure 3:
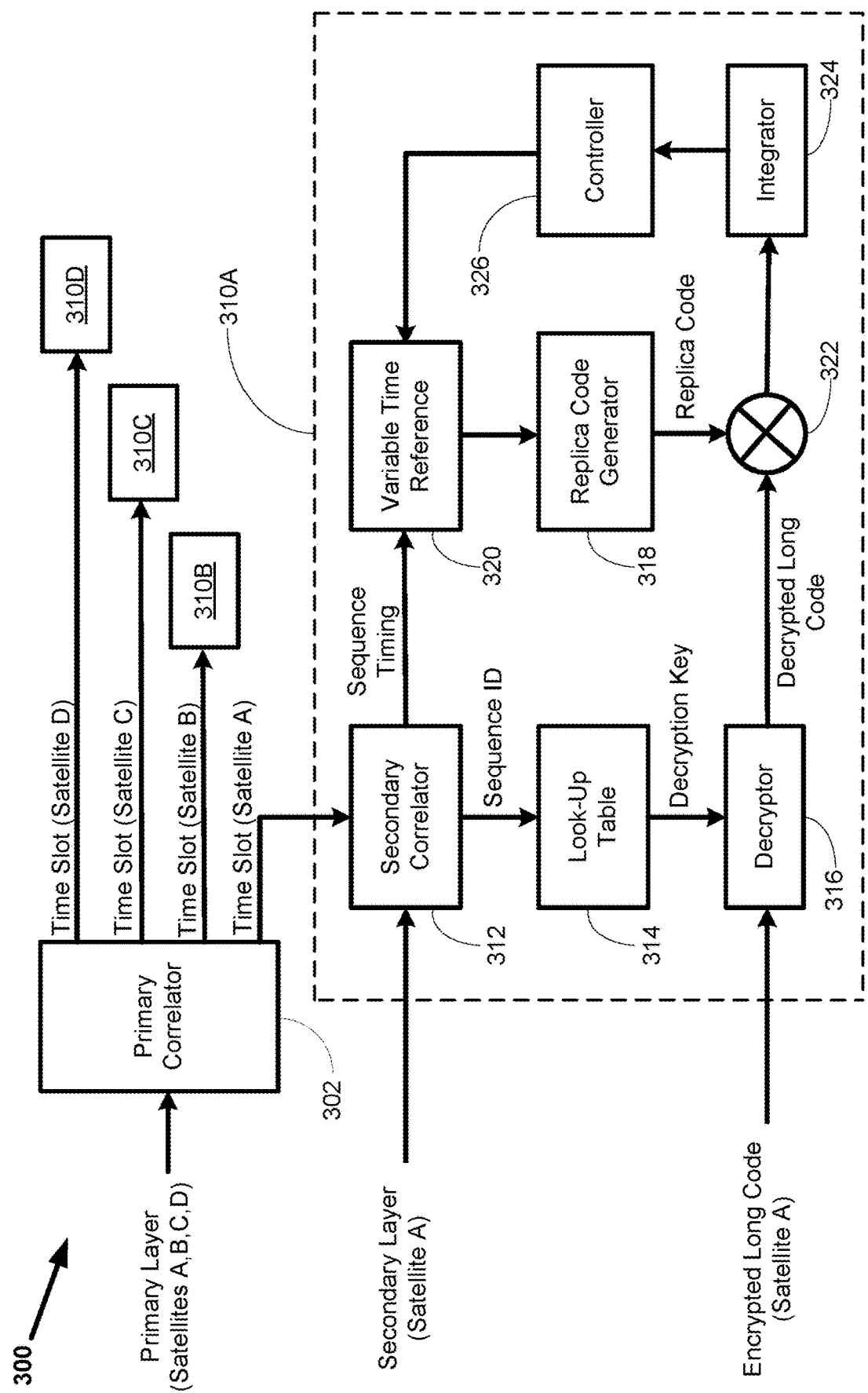
FIG. 3 is a block diagram of an example receiver, in accordance with example embodiments.

FIG. 3 is a block diagram of an example receiver 300. In this example, receiver 300 is configured to receive aiding signals (e.g., structured as shown in FIG. 2) and navigation signals from four satellites (described herein as Satellite A, Satellite B, Satellite C, and Satellite D) and use the aiding signal from each satellite to decrypt and acquire the long code in the satellite's navigation signal. The receiver 300 includes a primary correlator 302 that receives the primary layer in each of the aiding signals and detects the primary code and determines the time slot defined by the primary code in each of the aiding signals. Primary correlator 302 may, for example, include one or more matched filters.

The primary correlator 302 provides as output timing information for each of the four satellite's time slots. As shown, primary correlator 302 outputs the Satellite A time slot timing to a receiver block 310A, which is configured to use the secondary layer in the aiding signal transmitted by Satellite A to decrypt and acquire the long code in the navigation signal transmitted by Satellite A. Primary correlator 302 also outputs time slot timing for Satellites B, C, and D to receiver blocks 310B, 310C, and 310D, respectively, which are configured to decrypt and acquire the long codes in the navigation signals transmitted by Satellites B, C, and C, respectively. Receiver blocks 310B, 310C, and 310D may be similar to receiver block 310A and so are not shown in detail in FIG. 3.

Receiver block 310A includes a secondary correlator 312 that receives the secondary layer in the aiding signal transmitted by Satellite A and detects the sequence of short codes and the timing of the short code sequence. Secondary correlator 312 also uses the Satellite A time slot timing output by primary correlator 302 to quickly and efficiently detect each short code in the sequence based on a known, predetermined time alignment between the instances of the primary code (or the time slots defined by the primary code) in the primary layer and the short codes in the secondary layer. In example embodiments, the secondary correlator 312 includes a plurality of matched filters, with each matched filter being configured to detect a respective short code in a library of N short codes.

Secondary correlator 312 provides as output an identification of the detected sequence (Sequence ID) and a timing of the detected sequence (Sequence Timing). In this example, receiver block 310A also includes a look-up table 314 that maps the Sequence ID to a decryption key that can be used to decrypted the encrypted long code in the navigation signal transmitted by Satellite A. Alternatively, receiver block 310A could use some other type of data structure or algorithm to determine the decryption key based on the Sequence ID.

A decryptor 316 receives the encrypted long code in the navigation signal transmitted by Satellite A and used the decryption key provided by the look-up table 314 to decrypt the encrypted long code. Decryptor 316 then outputs the decrypted long code.

Receiver block 310A can acquire the decrypted long code by using simple correlation, discrete Fourier transforms, or in some other manner. The acquisition of the decrypted long code is aided by the Sequence Timing output by the second correlator 312.

For purposes of illustration, receiver block 310A is shown with components to implement simple correlation. In this approach, a replica code generator 318 generates replica codes based on a variable time reference 320. A multiplier 322 computes dot products of the replica codes and the decrypted long code (or a portion thereof), which is then integrated by an integrator 324. The output of the integrator 324 is maximal when the replica code based on the variable time reference 320 is synchronized with the decrypted long code. A controller 326 can monitor the output of the integrator and control variable time reference 320 to adjust the timing of the replica code until the replica code is synchronized with the decrypted long code, as indicated by the output of integrator 324 reaching a maximum value (or exceeding a predetermined threshold value).

Once the replica code is synchronized with the decrypted long code, receiver block 310A has acquired the long code in the navigation signal transmitted by Satellite A and can use the acquired long code to calculate a range to Satellite A. Receiver block 310A can also recover the navigation message in the navigation signal to get ephemeris data for Satellite A. Receiver blocks 310B, 310C, and 310D can function in a similar manner to acquire the long codes and recover the navigation messages in the navigation signals transmitted by Satellites B, C, and D, respectively. Receiver 300 can then use this information to determine a location of receiver 300, for example, a location in terms of latitude, longitude, and elevation.

To reduce the time it takes to synchronize the replica code with the decrypted long code, the variable time reference 320 can make use of the Sequence Timing output by the secondary controller 312. In implementations in which the long codes have the same duration as the short code sequences, the Sequence Timing can be used to determine the specific time (with an accuracy dependent upon the chip rate of the short code) when each instance of the long code will begin. In implementations in which the long codes have a longer duration than the short code sequences, the Sequence Timing can be used to identify a small number of times (e.g., integer second boundaries) when an instance of the long code may begin. Either way, the search space and the associated amount of time it takes to synchronize with the decrypted long code can be greatly reduced.

As noted above, a conventional GPS receiver may take several minutes to obtain a first location fix in a cold start case (i.e., when the receiver does not have any information about its location or which satellites might be in view). By using the timing information acquired from the aiding signals, however, receiver 300 may be able to obtain a first location fix in under one minute in a cold start case. Moreover, receiver 300 may obtain location fixes this quickly even when the long codes transmitted by the satellites are encrypted.

Related Embodiments

In the example embodiments described above for FIGS. 1-3, the aiding signals are used to acquire the long codes in wireless navigation signals transmitted by satellites. It is to be understood, however, that aiding signals could also be used to acquire long codes transmitted by other types of transmitters (e.g., transmitters in cellular wireless networks, transmitters in terrestrial-based navigation systems, etc.). Moreover, the long codes that are acquired using aiding signals could be used for ranging, or they could be used for other purposes (e.g., spread spectrum communication of any type of data). Thus, while satellite-based navigation systems can benefit for aiding signals, such aiding signals could also be used in embodiments that do not involve satellites and/or do not involve navigation or location determination.

Example Method of Operation

Figure 4:
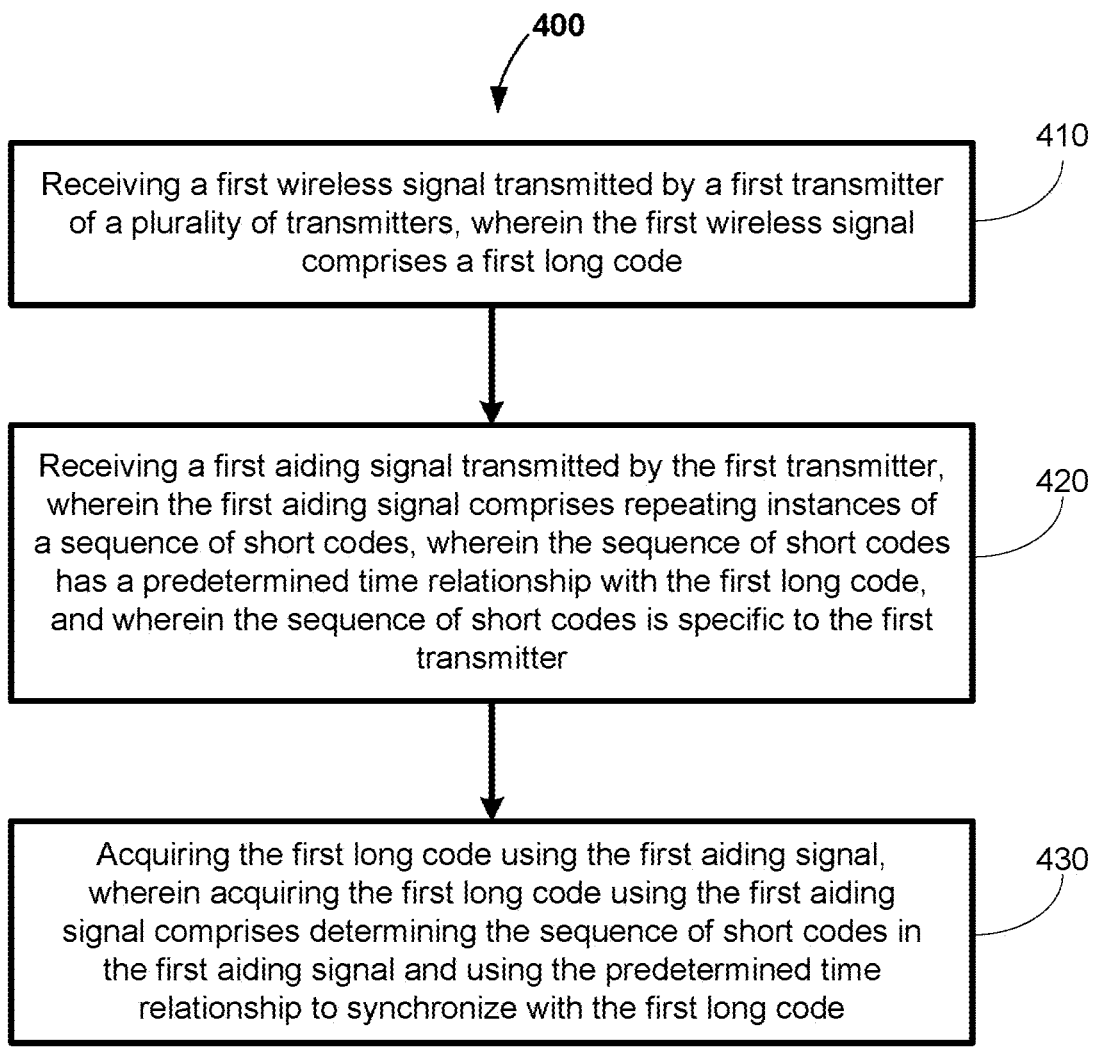
FIG. 4 illustrates a flowchart of an example method, in accordance with example embodiments.

FIG. 4 is a flowchart, in accordance with example embodiments. Method 400 may include various blocks or steps. The blocks or steps may be carried out individually or in combination. The blocks or steps may be carried out in any order and/or in series or in parallel. Further, blocks or steps may be omitted or added to method 400.

Method 400 may be carried out by various elements of receiver 300 shown in FIG. 3, or by other types of devices.

Block 410 involves receiving a first wireless signal transmitted by a first transmitter of a plurality of transmitters, wherein the first wireless signal comprises a first long code.

Block 420 involves receiving a first aiding signal transmitted by the first transmitter, wherein the first aiding signal comprises repeating instances of a sequence of short codes, wherein the sequence of short codes has a predetermined time relationship with the first long code, and wherein the sequence of short codes is specific to the first transmitter.

Block 430 involves acquiring the first long code using the first aiding signal, wherein acquiring the first long code using the first aiding signal comprises determining the sequence of short codes in the first aiding signal and using the predetermined time relationship to synchronize with the first long code.

In some embodiments, the first long code is encrypted according to a first encryption associated with the first transmitter. In such embodiments, method 400 can additionally involve identifying the first transmitter based on the sequence of short codes and decrypting the first long code based on the identified first transmitter. Further, in such embodiments, each respective transmitter of the plurality of transmitters may transmit (i) a respective wireless signal, the respective wireless signal comprising a respective long code encrypted according to a respective encryption that is associated with the respective transmitter and (ii) a respective aiding signal. To accommodate this, decrypting the long code based on the identified first transmitter can involve obtaining a first decryption key for decrypting the first long code using a data structure (e.g., a look-up table) that maps each transmitter of the plurality of transmitters to a respective decryption key and decrypting the first long code using the first decryption key.

In some embodiments, the aiding signal includes a primary layer comprising repeating instances of a primary code and a secondary layer comprising the repeating instances of the sequence of short codes, wherein each short code has a predetermined time alignment with a respective instance of the primary code. In some of such embodiments, each short code in the sequence of short codes is equal in length to the primary code. In some of such embodiments, the primary code is orthogonal to cyclic shifts of itself. In some of such embodiments, the short codes in the sequence of short codes is selected from a library of N short codes, wherein N>1. For example, N could be 12 or greater. In some of such embodiments, the sequence of short codes includes M distinct short codes, wherein M≤N. In some of such embodiments, the N short codes are mutually orthogonal. To achieve this orthogonality, the N short codes could be, for example, Reed-Solomon codes, Gold codes, or Kasami codes.

In some embodiments in which the aiding signal includes a primary layer comprising repeating instances of a primary code and a secondary layer comprising the repeating instances of the sequence of short codes and each short code has a predetermined time alignment with a respective instance of the primary code, acquiring the first long code using the aiding signal further involves detecting an instance of the primary code in the first layer and determining the sequence of short codes in the secondary layer based on the detected instance of the primary code and the predetermined time alignment.

In some embodiments, the plurality of transmitters includes a plurality of satellites, the first transmitter includes a first satellite of the plurality of satellites, and the first long code is a first ranging code. In such embodiments, method 400 may further involve determining a location using the first ranging code. Determining the location may additionally involve a second satellite, a third satellite, and a fourth satellite as follows: receiving a second wireless signal transmitted by the second satellite of the plurality of satellites, wherein the second wireless signal comprises a second ranging code; receiving a second aiding signal transmitted by the second satellite; acquiring the second ranging code using the second aiding signal; receiving a third wireless signal transmitted by the third satellite of the plurality of satellites, wherein the third wireless signal comprises a third ranging code; receiving a third aiding signal transmitted by the third satellite; acquiring the third ranging code using the third aiding signal; receiving a fourth wireless signal transmitted by the fourth satellite of the plurality of satellites, wherein the fourth wireless signal comprises a fourth ranging code; receiving a fourth aiding signal transmitted by the fourth satellite; acquiring the fourth ranging code using the fourth aiding signal; and determining the location using the first ranging code, the second ranging code, the third ranging code, and the fourth ranging code.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information and/or comparison of signals can correspond to circuitry that can be configured to perform the specific logical functions of a herein-described method or technique. Alternatively or additionally, a step or block that represents a processing of information and/or comparison of signals can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

As described herein, the computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C++, HTTP, Java, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. A component may be implemented in hardware electronic components, software components, and a combination of both.

Generally, application includes programs, routines, objects, widgets, plug-ins, and other similar structures that perform particular tasks or implement particular abstract data types. Those skilled in the art can implement the description and/or figures herein as computer-executable instructions, which can be embodied on any form of computing machine-readable media discussed herein.

Many functions performed by electronic hardware components can be duplicated by software emulation. Thus, a software program written to accomplish those same functions can emulate the functionality of the hardware components in input-output circuitry.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A method, comprising:
    receiving a first wireless signal transmitted by a first transmitter of a plurality of transmitters, wherein the first wireless signal comprises a first long code;
    receiving a first aiding signal transmitted by the first transmitter, wherein the first aiding signal comprises repeating instances of a sequence of short codes, wherein the sequence of short codes includes M distinct short codes and M>1, wherein the sequence of short codes has a predetermined time relationship with the first long code, and wherein the sequence of short codes is specific to the first transmitter; and
    acquiring the first long code using the first aiding signal, wherein acquiring the first long code using the first aiding signal comprises identifying the sequence of short codes in the first aiding signal and using the predetermined time relationship to synchronize with the first long code, wherein identifying the sequence of short codes comprises determining each short code of the M distinct short codes.

2. The method of claim 1, wherein the first long code is encrypted according to a first encryption associated with the first transmitter, further comprising:
    identifying the first transmitter based on the identified sequence of short codes; and
    decrypting the first long code based on the identified first transmitter.

3. The method of claim 2, wherein each respective transmitter of the plurality of transmitters transmits (i) a respective wireless signal, the respective wireless signal comprising a respective long code encrypted according to a respective encryption that is associated with the respective transmitter and (ii) a respective aiding signal, wherein decrypting the long code based on the identified first transmitter comprises:
    obtaining a first decryption key for decrypting the first long code using a data structure that maps each transmitter of the plurality of transmitters to a respective decryption key; and
    decrypting the first long code using the first decryption key.

4. The method of claim 1, wherein the aiding signal comprises:
    a primary layer comprising repeating instances of a primary code; and
    a secondary layer comprising the repeating instances of the sequence of short codes, wherein each short code in the sequence of short codes is equal in length to the primary code and has a predetermined time alignment with a respective instance of the primary code.

5. The method of claim 4, wherein the primary code is orthogonal to cyclic shifts of itself.

6. The method of claim 4, wherein the M distinct short codes are selected from a library of N short codes, wherein N>1, and wherein M≤N.

7. The method of claim 6, wherein N≥12.

8. The method of claim 6, wherein determining each short code of the M distinct short codes comprises using N matched filters to detect the M distinct short codes, wherein each matched filter is configured to detect a respective short code in the library of N short codes.

9. The method of claim 6, wherein the N short codes are mutually orthogonal.

10. The method of claim 9, wherein the N short codes are Gold codes or Kasami codes.

11. The method of claim 4, wherein acquiring the first long code using the aiding signal further comprises:
    detecting an instance of the primary code in the first layer; and
    identifying the sequence of short codes in the secondary layer based on the detected instance of the primary code and the predetermined time alignment.

12. The method of claim 1, wherein the plurality of transmitters comprises a plurality of satellites, wherein the first transmitter comprises a first satellite of the plurality of satellites, and wherein the first long code is a first ranging code, further comprising:
    determining a location using the first ranging code.

13. The method of claim 12, further comprising:
    receiving a second wireless signal transmitted by a second satellite of the plurality of satellites, wherein the second wireless signal comprises a second ranging code;
    receiving a second aiding signal transmitted by the second satellite;
    acquiring the second ranging code using the second aiding signal;
    receiving a third wireless signal transmitted by a third satellite of the plurality of satellites, wherein the third wireless signal comprises a third ranging code;
    receiving a third aiding signal transmitted by the third satellite;
    acquiring the third ranging code using the third aiding signal;
    receiving a fourth wireless signal transmitted by a fourth satellite of the plurality of satellites, wherein the fourth wireless signal comprises a fourth ranging code;
    receiving a fourth aiding signal transmitted by the fourth satellite;
    acquiring the fourth ranging code using the fourth aiding signal; and
    determining the location using the first ranging code, the second ranging code, the third ranging code, and the fourth ranging code.

14. A receiver, wherein the receiver is configured to perform a method comprising:

receiving a first wireless signal transmitted by a first transmitter of a plurality of transmitters, wherein the first wireless signal comprises a first long code;

receiving a first aiding signal transmitted by the first transmitter, wherein the first aiding signal comprises repeating instances of a sequence of short codes, wherein the sequence of short codes includes M distinct short codes and M>1, wherein the sequence of short codes has a predetermined time relationship with the first long code, and wherein the sequence of short codes is specific to the first transmitter; and acquiring the first long code using the first aiding signal, wherein acquiring the first long code using the first aiding signal comprises identifying the sequence of short codes in the first aiding signal and using the predetermined time relationship to synchronize with the first long code, wherein identifying the sequence of short codes comprises determining each short code of the M distinct short codes.

15. A transmitter, wherein the transmitter is configured to:
transmit a first wireless signal, wherein the first wireless signal comprises a first long code; and
transmit a first aiding signal, wherein the first aiding signal comprises repeating instances of a sequence of short codes, wherein the sequence of short codes includes M distinct short codes and M>1, wherein the sequence of short codes has a predetermined time relationship with the first long code, and wherein the sequence of short codes is specific to the transmitter.

16. The transmitter of claim 15, wherein the transmitter comprises a first satellite of a plurality of satellites, wherein the first long code is a first ranging code.

17. The transmitter of claim 15, wherein the first long code is encrypted.

18. The transmitter of claim 15, wherein the aiding signal comprises:
a primary layer comprising repeating instances of a primary code; and
a secondary layer comprising the repeating instances of the sequence of short codes, wherein each short code in the sequence of short codes is equal in length to the primary code and has a predetermined time alignment with a respective instance of the primary code.

19. The transmitter of claim 18, wherein the primary code is orthogonal to cyclic shifts of itself.

20. The transmitter of claim 18, wherein the short codes in the sequence of short codes are selected from a library of N short codes, wherein N>1, and wherein the N short codes are mutually orthogonal.

* * * * *